United States Patent [19]

Matsushita

[11] Patent Number: 4,524,861
[45] Date of Patent: Jun. 25, 1985

[54] CONVEYOR DRIVING ROLLER

[75] Inventor: Yoshihiro Matsushita, Inuyama, Japan

[73] Assignees: Tsubakimoto Machinery & Engineering Co., Ltd.; Line Industry Corp., both of Japan

[21] Appl. No.: 416,676

[22] Filed: Sep. 10, 1982

[30] Foreign Application Priority Data

Feb. 4, 1982 [JP] Japan .............. 57-14654[U]

[51] Int. Cl.³ .................................... B65G 13/02
[52] U.S. Cl. ............................ 198/781; 198/789
[58] Field of Search ........................ 198/781, 789

[56] References Cited

U.S. PATENT DOCUMENTS 4,111,087 9/1978 Pankratz et al. ............. 198/781 X
4,314,629 2/1982 Shilander et al. ........... 198/789 X
4,325,474 4/1982 Rae .................................. 198/781

Primary Examiner—Joseph E. Valenza
Assistant Examiner—Stuart J. Millman
Attorney, Agent, or Firm—Pahl, Lorusso & Loud

[57] ABSTRACT

The disclosed invention relates to an adaption of a conventional conveyor driving roller whereby the driving force frictionally transmitted from a rotating shaft to the article conveying roller is maintained even under conditions wherein oil or water enters between the frictionally engaging surfaces. Specifically, a pressure plate is provided at one end face of the roller which is spring biased for frictionally engaging that roller end face. Provision is made for adjustment of the degree of compression of the pressure plate biasing spring so that the degree of frictional force between the pressure plate and the roller end face may be varied.

3 Claims, 1 Drawing Figure

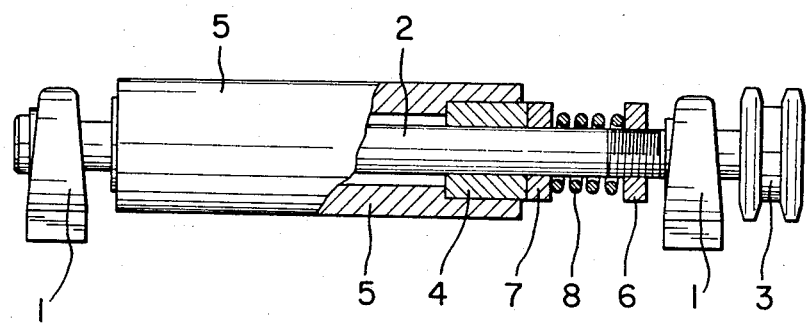

CONVEYOR DRIVING ROLLER

BACKGROUND OF THE INVENTION

This invention relates to a conveyor driving roller capable of conveying and accumulating articles carried on a roller conveyor.

Conventional conveyor driving rollers are of a construction wherein a roller is fitted over bushings which are mounted on a rotatable shaft and which may slip on the shaft for rotation relative thereto. The bushings frictionally engage the rotatable shaft and rotate with the shaft under the weight of a conveyed article. With such a construction, however, where the conveyed articles carry adhering oil or water, the roller is frictionally driven and rotates as expected to fulfill its conveying function properly during early operation. With entry of oil or water between the rotating shaft and the roller, over time, the frictional force between the two decreases to such a great extent, that when even a slight resistance is applied to the article under conveyance, for example, when the article under conveyance contacts a guide bar on the conveyor line, there occurs slip between the rotating shaft and the roller, thus making it impossible to transmit the torque of the rotating shaft to the roller, with consequent loss of the conveyor's function.

SUMMARY OF THE INVENTION

In order to eliminate the foregoing problem, the present invention provides a conveyor driving roller wherein, when slip would occur due to a decrease in the frictional force between the rotating shaft and the roller, proper conveying force is maintained through a pressure plate which frictionally engages one end face of the roller.

BRIEF DESCRIPTION OF THE DRAWING

The accompanying drawing is a partially cutaway front view of a conveyor driving roller in accordance with the present invention.

DESCRIPTION OF THE PREFERRED EMBODIMENT

An embodiment of the present invention will be described hereinunder with reference to the accompanying drawing.

The reference numeral 2 designates a rotatable shaft mounted on bearings 1,1. To one end of the rotatable shaft 2 is fixed a sprocket 3 around which is wound a chain (not shown) driven by a motor. A cylindrical roller 5 is fitted over bushings 4 (one of which is shown) which are rotatable with respect to the shaft 2. The bushings 4 are frictionally engaged by and rotate with the shaft under the weight of conveyed articles. An adjusting nut 6 is threaded onto one end of the rotating shaft 2. A pressure plate 7 slides axially on shaft 2 and is adapted to rotate integrally therewith. A compression spring 8 is interposed between the adjusting nut 6 and the pressure plate 7. By virtue of the biasing force of the spring 8 the plate 7 is pressed against one side of the bushing 4 which is integrally fitted within the roller 5 and which forms the end face of the roller.

In the above construction, when the rotating shaft 2 is motor driven through the chain wound around the sprocket 3, there occurs friction between the rotating shaft 2 and the bushing 4 by virtue of the weight of an article carried on the roller 5, whereby the torque of the rotating shaft 2 is frictionally transmitted to the roller 5, thus causing the latter to rotate and convey the article. When the article under conveyance is stopped forcibly by means of a stopper or the like, the frictional force generated between the roller 5 and the article under conveyance becomes larger than the frictional force between the rotating shaft 2 and the bushing 4, so that slip occurs between the rotating shaft 2 and the bushing 4; therefore, the roller 5 ceases rotation. As the succeeding article under conveyance abuts the preceding stopped article, it is stopped by virtue of the same action, and thus the conveyed articles are accumulated successively on the conveyor line.

In the aforementioned conveyance of articles by the frictional drive between the roller 5 and rotating shaft 2, if oil or water enters between the rotating shaft 2 and the bushing 4, the frictional force between the two would conventionally decrease to the extent that slip would easily occur, thus resulting in a large decrease of the conveying force of the roller 5. With the present invention, however, since the pressure plate 7 is held in pressure contact with the side of the bushing 4 by means of the spring 8, there occurs friction between the pressure plate 7 and the bushing 4, so that the torque of the rotating shaft 2 is transmitted to the roller 5 through the bushing 4, thereby permitting the roller 5 to continue being frictionally driven and thereby creating a conveyance force. The frictional force between the pressure member 7 and the bushing 4 is adjustable by changing the degree of compression of the spring 8 against the pressure member 7 by turning the adjusting nut 6. By such adjustments, it is possible to maintain a proper conveying force at all times.

In the described embodiment, the bushings 4 are interposed between the shaft 2 and the roller 5. In an alternative embodiment the roller 5 may be fitted over the rotating shaft 2 directly without using bushings so that it is frictionally driven by the rotating shaft 2. In this latter embodiment, it goes without saying that the pressure plate 7 is brought into pressure contact directly with the end face of the roller 5 itself.

According to the present invention having the above construction, even if oil or water enters between the rotating shaft 2 and the roller 5, the frictional force between the rotating shaft 2 and the roller 5 is strengthened by the pressure plate 7 which urges against and end face of the roller 5, whereby a proper conveying force can be imparted to the roller 5 and the conveyance function of the roller 5 can be appropriately maintained under all circumstances.

What is claimed is:

1. A conveyor driving roller comprising:
   a shaft mounted for rotation about its longitudinal axis;
   a cylindrical roller member mounted over said rotatable shaft through bushings mounted within the ends of said cylindrical roller member, said cylindrical roller member being adapted to be frictionally engaged and driven by said rotatable shaft through said bushings, said bushings being rotatable with respect to said shaft and being frictionally engaged and driven by said shaft;
   a pressure plate slidably mounted on said rotatable shaft adjacent one end of said cylindrical roller member;
   a compression spring mounted on said shaft and bearing against the face of said pressure plate opposite the face engaging said one end of said roller member; and means for adjusting the degree of compression of said spring.

2. The conveyor roller of claim 1 wherein said bushings are press-fit into the ends of said cylindrical roller member.

3. The conveyor driving roller of claim 1 wherein said adjustment means is a nut threaded onto said shaft and confining said spring between said nut and said pressure plate.

* * * * *